(12) United States Patent
Reuter et al.

(10) Patent No.: US 6,679,566 B2
(45) Date of Patent: Jan. 20, 2004

(54) ELECTRO-HYDRAULIC BRAKING SYSTEM HAVING ISOLATION PISTONS

(75) Inventors: David F. Reuter, Beavercreek, OH (US); Jerry L. Newton, Richmond, IN (US); Robert S. Mattern, Grosse Ile, MI (US)

(73) Assignee: Delphi Technologies, Inc., Troy, MI (US)

( * ) Notice: Subject to any disclaimer, the term of this patent is extended or adjusted under 35 U.S.C. 154(b) by 90 days.

(21) Appl. No.: 10/017,043

(22) Filed: Dec. 14, 2001

(65) Prior Publication Data

US 2003/0111898 A1 Jun. 19, 2003

(51) Int. Cl.$^7$ ............................................... B60T 15/46
(52) U.S. Cl. .................................................... 303/84.2
(58) Field of Search ...................... 303/122.09, 113.5, 303/115.1, 115.4, 116.1, 116.2, 119.1, 119.2, DIG. 10, 84.2; 137/630.15, 599.01, 596.17

(56) References Cited

U.S. PATENT DOCUMENTS

| 4,824,188 | A | * | 4/1989 | Hatch .................... 303/115.4 |
| 5,013,098 | A | | 5/1991 | Mergenthaler |
| 5,215,357 | A | * | 6/1993 | Brown .................... 303/113.2 |
| 5,538,336 | A | | 7/1996 | Reuter et al. |
| 5,590,936 | A | | 1/1997 | Reuter |
| 5,607,208 | A | | 3/1997 | Reuter et al. |
| 5,618,086 | A | | 4/1997 | Reuter |
| 5,927,827 | A | | 7/1999 | Reuter et al. |
| 5,967,625 | A | | 10/1999 | Reuter et al. |
| 6,024,423 | A | | 2/2000 | Reuter .................... 303/115.4 |
| 6,244,672 | B1 | | 6/2001 | Hachtel |
| 6,247,766 | B1 | | 6/2001 | Subramanian et al. ... 303/119.2 |

* cited by examiner

*Primary Examiner*—Pam Rodriguez
(74) *Attorney, Agent, or Firm*—Scott A. McBain

(57) ABSTRACT

An electro-hydraulic brake system containing four isolation piston assemblies each of which is comprised of a cylinder, a piston, and a pair of hydraulic lines. The cylinder has only two apertures, and the piston is disposed in the cylinder. The first hydraulic line communicates between a wheel brake and a first side of the piston through one of the apertures. The second hydraulic line communicates between an accumulator and a second side of the piston through the other of the apertures. The system components are arranged in a compact, easy to manufacture package.

5 Claims, 7 Drawing Sheets

ELECTRO-HYDRAULIC BRAKING SYSTEM HAVING ISOLATION PISTONS

TECHNICAL FIELD OF THE INVENTION

This invention relates generally to braking systems for motor vehicles, and more specifically, to a braking system having an electro-hydraulic apply system with isolation pistons and a four-wheel hydraulic failsafe brake circuit.

BACKGROUND OF THE INVENTION

Braking systems commonly known as brake-by-wire (BBW) typically include a brake pedal that does not directly communicate hydraulic pressure to the wheel brakes. Such BBW systems rely on automatic electric or electric-hydraulic means to remotely activate the brakes. In one type of electro-hydraulic braking system, the brake pedal does not communicate directly with the wheel brakes in normal mode. Instead, the hydraulic connection is blocked by solenoid-acutated isolation valves. The driver's braking intent is communicated to the Electronic Control Unit (ECU) through various sensors built into the pedal feel emulator and master cylinder assemblies. The ECU processes the signals and sends subsequent commands to the hydraulic modulator to generate the desired wheel pressures. However, in failsafe mode, the wheel brakes are in direct hydraulic communication with a master cylinder.

SUMMARY OF THE INVENTION

The present invention is an isolation piston assembly comprising a cylinder, a piston, and a pair of hydraulic lines. The cylinder has only two apertures, and the piston is disposed in the cylinder. The first hydraulic line communicates between a wheel brake and a first side of the piston through one of the apertures. The second hydraulic line communicates between an accumulator and a second side of the piston through the other of the apertures.

One object of the present invention is to provide an isolation piston assembly of the type described above that has only a single seal.

Another object of the present invention is to provide a braking circuit including an isolation piston assembly of the type described above that has a four-wheel hydraulic failsafe mode for either front/rear or diagonal split base brake systems.

Still another object of the present invention is to provide a compact, simplified, easy to manufacture and robust braking system.

These and other features and advantages of the invention are apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
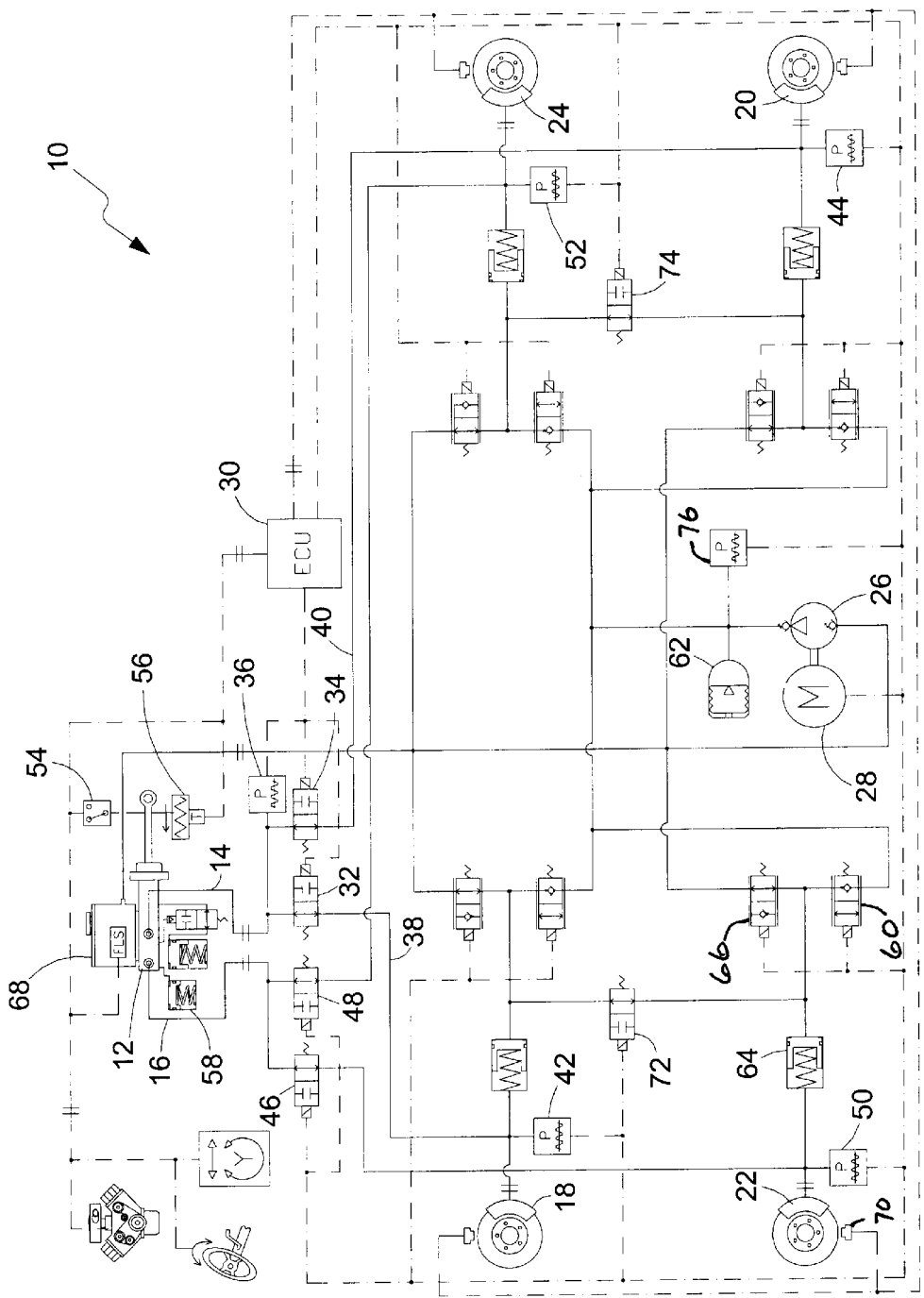
FIG. 1 is a schematic view of a diagonal split braking system according to the present invention.

FIG. 1 shows a vehicle brake control system 10 according to the present invention. The brake control system 10 includes a conventional master cylinder 12 that is operable to produce a pressure in passages 14 and 16 when the operator depresses the vehicle brake pedal, not shown. The passages 14 and 16 supply pressurized fluid to separate, substantially identical circuits. The system 10 is a diagonal split in which each of the two brake circuits controls wheels on diagonally opposite sides of the vehicle. For example, one circuit controls the right front wheel brake 18 and the left rear wheel brake 20, and the other circuit controls the left front wheel brake 22 and the right rear wheel brake 24. The brake control system 10 also includes a positive displacement pump 26 that is driven by an electric motor 28. An ECU 30 controls the speed of the motor 28, and accordingly controls the output volume of the pump 26.

The passage 14 is in fluid communication with a pair of isolation valves 32 and 34, and a primary master cylinder pressure sensor 36. The valves 32 and 34 are solenoid controlled two-position directional valves that are normally open to connect the passage 14 with passages 38 and 40. The passage 38 communicates with the wheel 18 and a wheel pressure sensor 42, while the passage 40 communicates with the wheel 20 and a wheel pressure sensor 44. Similarly, the passage 16 communicates with secondary isolation valves 46 and 48 that are normally open to respectively connect the master cylinder with the wheel 22 and a wheel pressure sensor 50, and the wheel 24 and a wheel pressure sensor 52.

The system 10 is an electro-hydraulic brake system equipped with a brake pedal switch 54, a pedal travel sensor 56, and a pedal feel emulator 58. In general, depression of the brake pedal does not directly displace brake fluid from the master cylinder. Instead, depression of the brake pedal causes the ECU 30 to close the isolation valves 32, 34, 46 and 48 and to operate the wheel brakes based on inputs from the various sensors. The difference is not apparent to the driver, however, because of the pedal feel emulator 58. Further details of this arrangement are available in U.S. patent application Ser. No. 09/842,478, which is hereby incorporated by reference. If the isolation valves are inoperable, however, there is a direct hydraulic link between the master cylinder 12 and the wheel brakes.

During normal braking, a normally closed apply valve 60 at each wheel is energized to communicate high-pressure fluid from an accumulator 62 to the wheel brake through an isolation piston assembly 64. Normally open release valves 66 are closed at this time. When the operator releases the brakes, the apply and release valves 60 and 66 revert to their normal state to return fluid to a reservoir 68. When the operator actuates the master cylinder to apply the brakes, sensors such as wheel speed sensors 70 indicate skidding to the ECU, any of the apply valves 60 may be independently closed and its corresponding release valve may be opened. To reapply the wheel brake, such as during an ABS event, any of the apply valves 60 is opened and its associated release valve is closed. A normally open balancing valve 72 is also provided across the front wheels 18 and 22, and a similar balancing valve 74 is provided across the rear wheels 20 and 24, to quickly balance the pressure across the axles such as during a panic brake activation. The pressure in accumulator 62 is maintained at a near constant pressure equal to or higher than the maximum wheel pressure needed for the vehicle's braking system to function properly. If at any time the pressure in the accumulator circuit drops below a prescribed set point or is not sufficient to permit the positive control needed at the wheels, the pump 26 can be driven at the required speed to build up the necessary line pressure as measured by accumulator pressure sensor 76.

If certain types of fault occur or if there is a total loss of power to the ECU, the system reverts to the failsafe mode of operation. In this instance, when the driver applies the brake pedal, the apply valves 60 and release valves 66 remain in their de-energized states. The isolation valves 32, 36, 46, and 48 are not energized and remain open to allow master cylinder 12 output in circuits 14 and 16 to flow directly into wheel brakes 18, 20, 22, and 24. The isolation piston assembly 64 prevents the master cylinder 12 brake fluid from entering into the pump circuit to maintain pressure integrity. The isolation piston assembly 64 also prevents any gas discharged into the pump circuit from an internal failure of the accumulator 62 from entering the wheel brakes 18, 22, 20, and 24 and master cylinder 12 interconnecting circuits.

Figure 2:
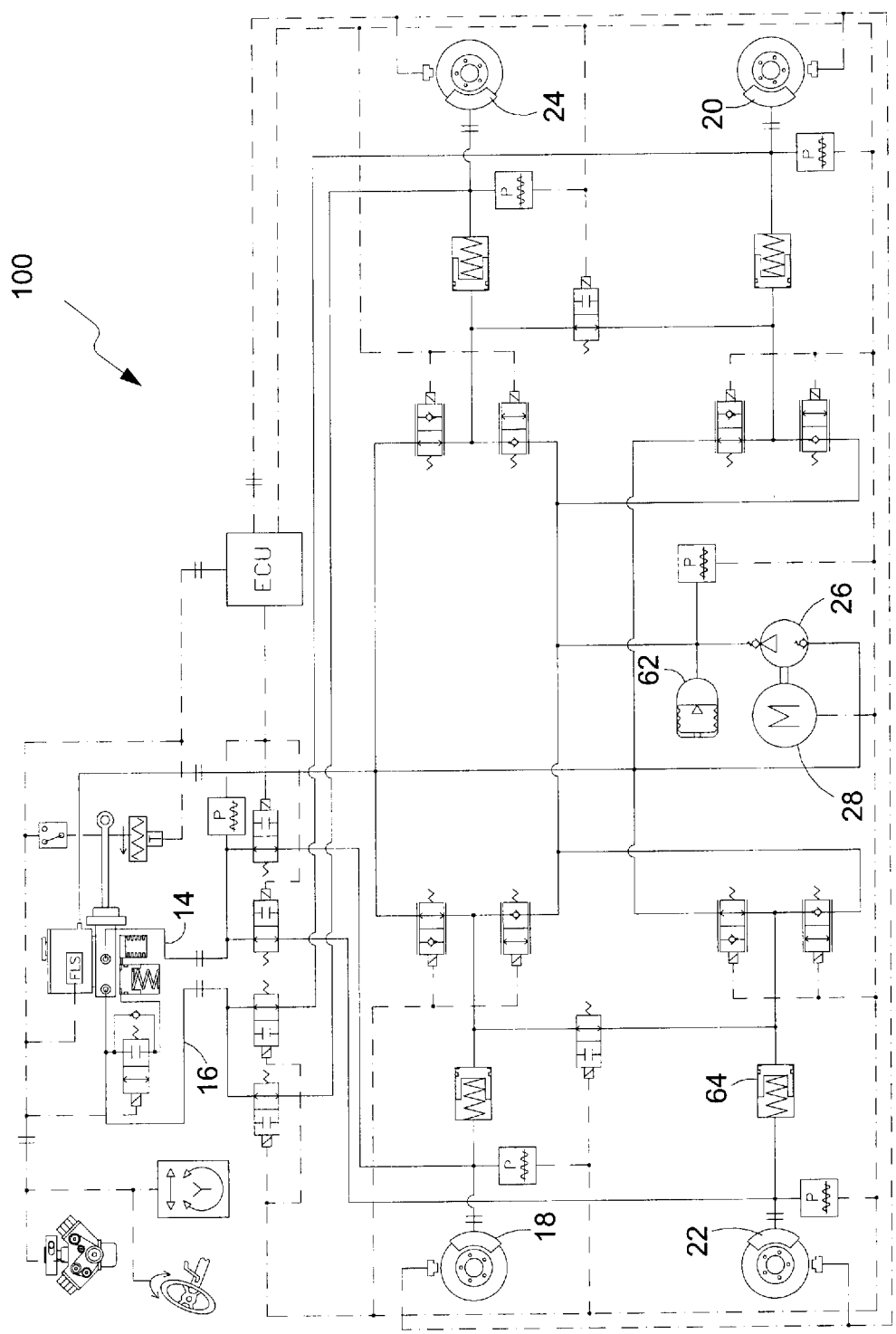
FIG. 2 is a schematic view of a front/rear split braking system according to the present invention.

FIG. 2 shows a front/rear split embodiment 100 of the present invention. In this design, the passage 14 communicates with the front wheel brakes 18 and 22, while the passage 16 communicates with the rear wheel brakes 20 and 24. As those skilled in the art will appreciate, the system 100 operates in other respects substantially similarly to the embodiment 10 shown in FIG. 1.

FIGS. 3a through 3d show the isolation piston assembly 64 in greater detail. The piston assembly 64 isolates the brake fluid on the wheel brake side of an isolation piston 120 from that on the pump circuit side of the piston. Thus, any gas, such as nitrogen used to charge the accumulator 62, is kept from entering the fluid circuits on the wheel brake side of the isolation piston should the diaphragm or bellows device normally used in the accumulator for such purposes, fail for any reason. The piston assembly 64 includes the piston 120 and a single, hydraulically balanced seal 122 that translate together in a cylinder or bore 124. Wheel brake pressure from the line 16 operates with a spring 126 to bias the piston 120 against the pressure developed in a line 128 on the pump side of the piston assembly. In the hydraulic circuits of the present invention, the piston assembly 64 lends itself to a simplified method of detecting the presence and functionality of the seal 122.

Figure 3A:
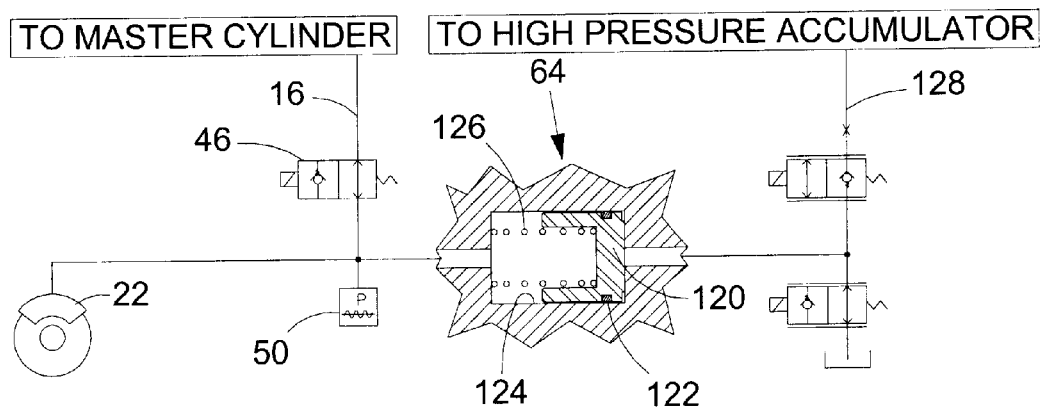
FIGS. 3a through 3d are schematic views of an isolation piston assembly for use with either of the braking systems shown in FIGS. 1 and 2.
Figure 3B:
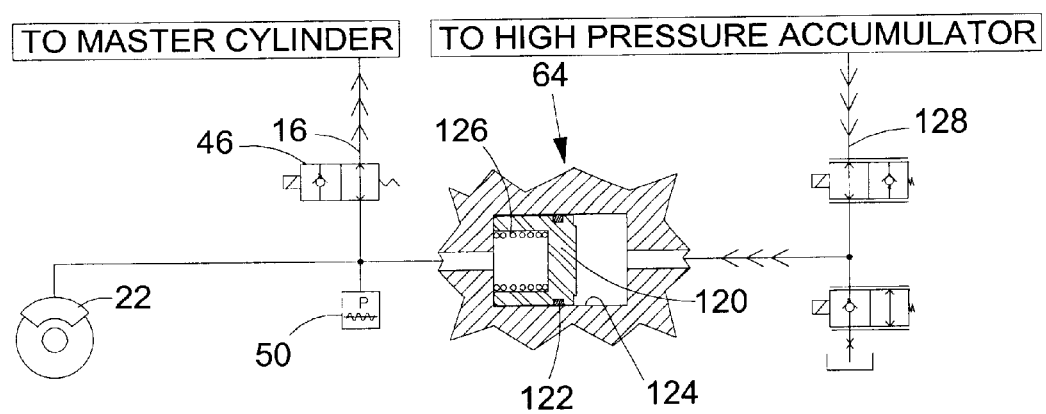
Figure 3C:
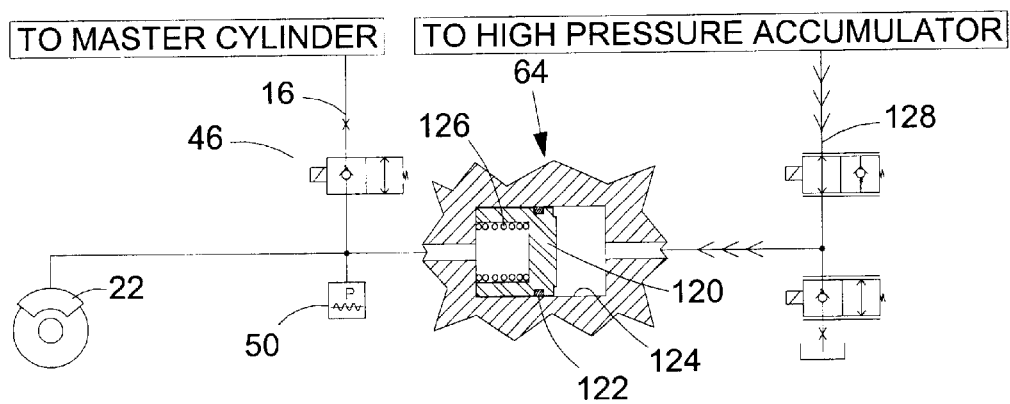
Figure 3D:
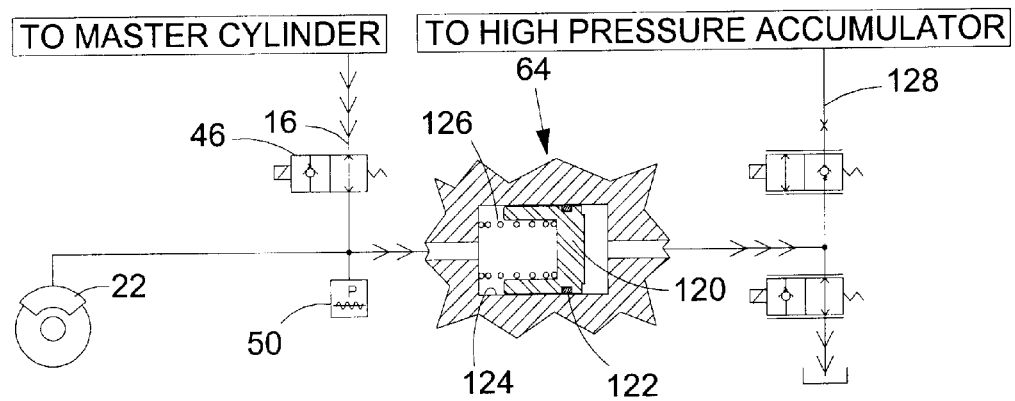

In a base position, the piston 120 is situated all the way to the right as shown in FIG. 3a. Pressure is then developed in the line 128 when apply valve 60 and release valve 66 are energized to appropriate levels to apply the wheel brake 22, while leaving the isolation valve 46 unenergized, until the isolation piston 120 translates to its maximum leftward travel as shown or "bottoms" in the cylinder 124. Next, the isolation valve 46 is closed, and the circuit is checked, preferably at the pressure sensor 50, for a rise in pressure at the wheel brake. The piston 120 can of course be returned to a home position thereafter. This algorithm is easily performed during a typical vehicle ignition start-up or shut down diagnostic routine. The functionality of isolation piston assembly 64 may also be conventionally checked using an air test on the EHB manufacturer's assembly line or on the vehicle manufacturer's assembly line using brake fluid.

Due to being in near equal hydraulic force balance, the piston assembly 64 provides very low seal drag and a corresponding reduction in wear on the seal. In comparison to dual seal isolation pistons, moreover, the present invention provides less seal hysteresis and correspondingly better control.

Figure 4:
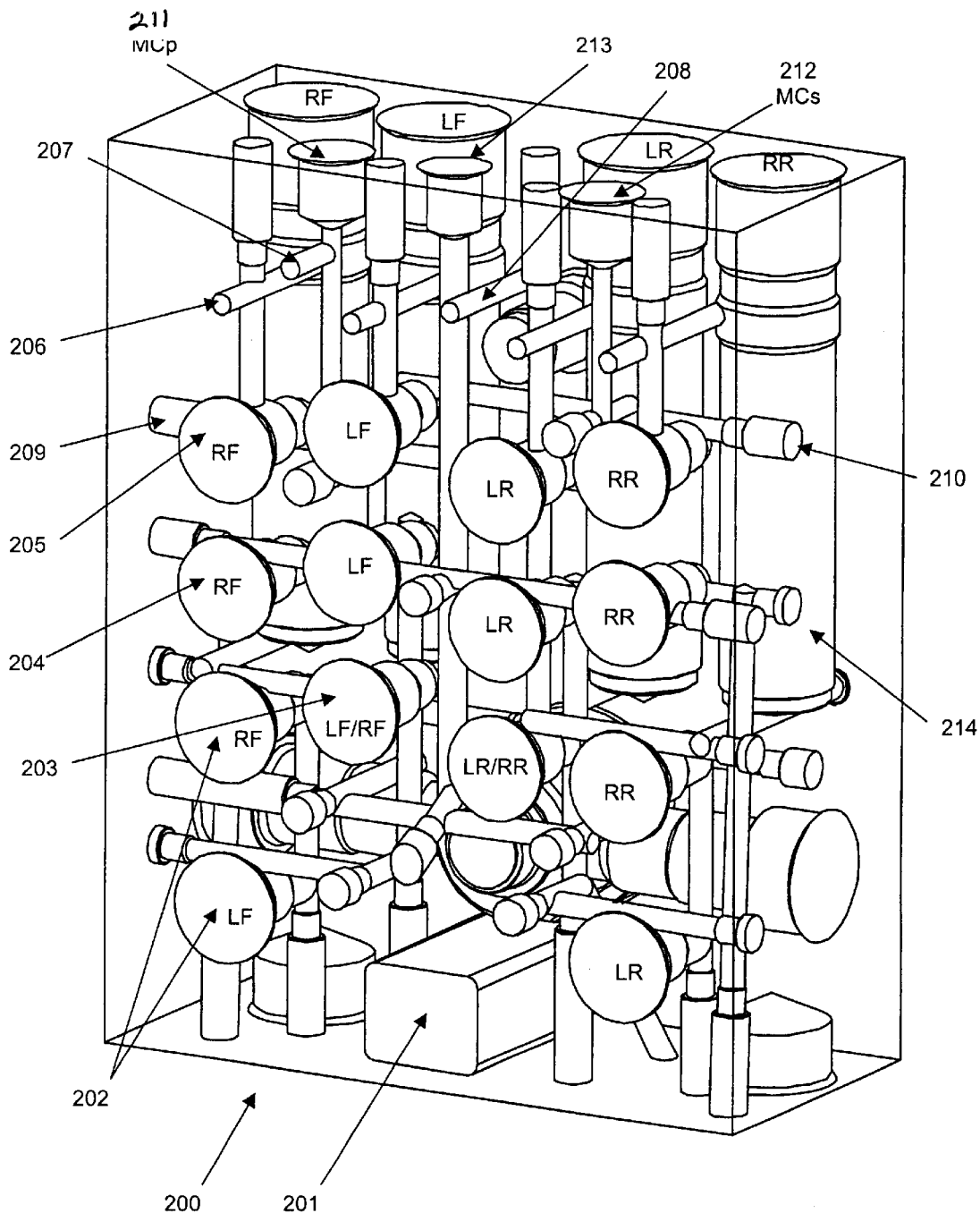
FIG. 4 is an isometric view of the compact body tools used to create the internal drillings for the diagonal split system from the ECU side.
Figure 5:
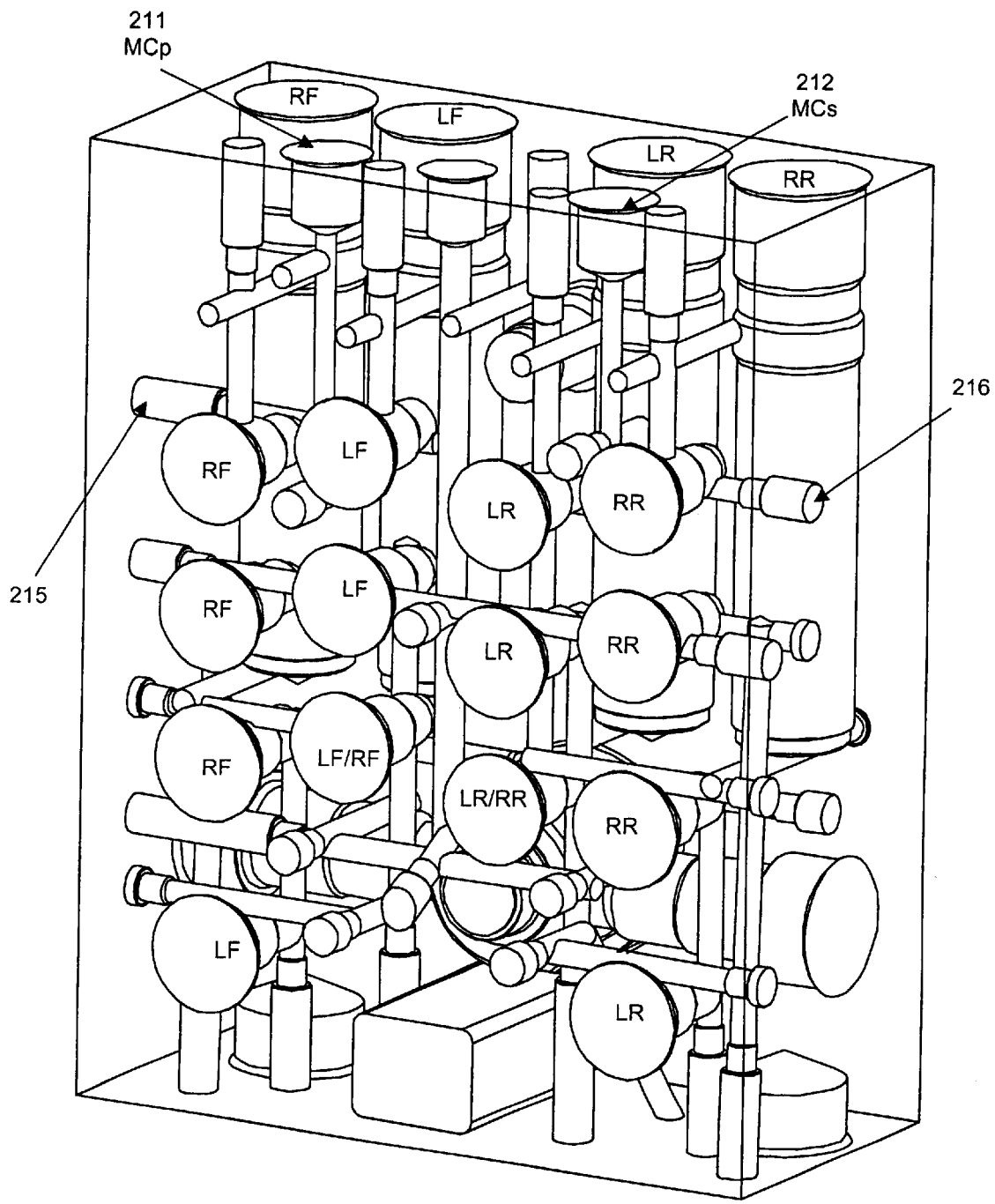
FIG. 5 is an isometric view of the compact body tools used to created the internal drillings for the front/rear split system from the ECU side.
Figure 6:
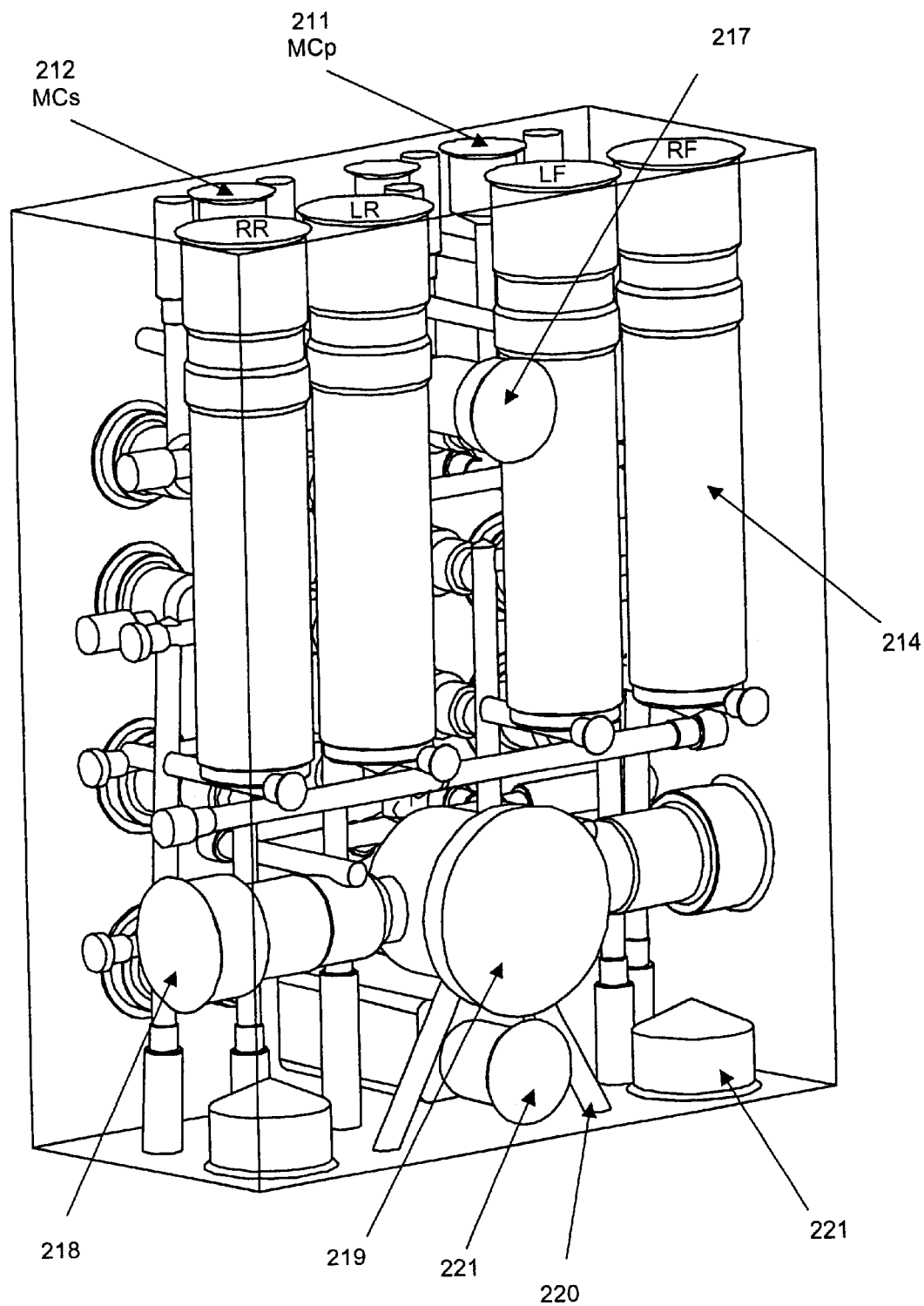
FIG. 6 is an isometric view of the compact body tools used to create the internal drillings applicable to either system from the pump side.

FIG. 4, FIG. 5, and FIG. 6 show a hydraulic modulator having unique drilling and machining arrangements which allows the many features to be fitted into a compact housing. Hydraulic modulator body 200 is comprised of various stepped bores which mount the many components of the electro-hydraulic brake system and which are interconnected by numerous cross-drilled holes as typified by hole 210.

Housing 200 also contains a rectangular opening 201 and stepped bore 221 to provide for an internal electrical connection scheme to the pump motor 26. The solenoid valves 32, 34, 46, 48, 60, 66, and 74 are mounted in stepped bores in an arrangement which allows for easy conversion from diagonal split to front/rear split configurations with minimum tool changes. The apply valves 60 are positioned in stepped bores 202 and are mirror images from each other, the release valves 66 in stepped bores 204 all positioned in a single horizontal row with a prescribed staggered offset, the balance valves 74 in stepped bores 203 which are both mirror imaged and staggered from each other, and the isolation valves 32, 34, 46, and 48 in stepped bores 205 also all positioned in a single horizontal row with a prescribed staggered offset. Only two holes 209 and 210 for the diagonal split system are required to change to the locations and depth of drilling shown by holes 215 and 216 respectively for the front/rear split system. It can be seen in FIG. 4 how hole 210 spans across the Left Front and Right Rear valve stepped bores 205 while missing the Left Rear valve stepped bore for a diagonal split system. For the front/rear split system, hole 216 position is moved transversely towards pump stepped bore 218 so that it now intersects the Left Rear and Right Rear solenoid stepped bores 205. The pressure sensor wheel brake interconnecting holes 206, the master cylinder pressure interconnecting hole 207, and the pump accumulator pressure interconnecting hole 208 all conveniently exit on a single face and in close proximity with one another to allow for ease of mounting a modular pressure sensor block (not shown) to house pressure sensors 36, 42, 44, 50, 52, and 67.

All of the inlet master cylinder ports 211 and 212 and outlet wheel ports located at the open ends of isolation piston bores 214 are situated on the top face of the unit. This simplifies underhood installation as all brake pipes may be routed together in a single, convenient bundle. The master cylinder inlet ports 211 and 212 typically contain threads so that brake pipe fittings may be attached directly to housing 200. The wheel outlet ports located at the open end of isolation piston bores 214 typically have a fitting not shown screwed or otherwise securely fastened to housing 200.

The pump bores 218, which are in mirror image arrangement of each other intersect the main pump motor bore 219, and along with bore 221 and feature 201 for the motor internal electrical connector provide a compact efficient means of mounting the externally located pump motor (not shown). Bores 221 also symmetrically located in housing 200 provide a means to attach the housing 200 to a suitable mounting bracket using isolation mounting grommets well known for this type of application. The accumulator mounting bore 217 allows packaging of the high-pressure accumulator assembly not shown conveniently just above the pump motor. Overall, the present invention provides a compact, simplified, easy to manufacture and robust braking system.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A brake circuit comprising:

a wheel brake;

an accumulator; and an isolation piston assembly including a cylinder having only two apertures, a piston disposed in the cylinder, a first hydraulic line communicating between the wheel brake and a first side of the piston through one of the apertures, and a second hydraulic line communicating between the accumulator and a second side of the piston through the other of the apertures and wherein the piston has only one seal.

2. The brake circuit of claim 1 further comprising a spring disposed in the cylinder and bearing against the first side of the piston.

3. The brake circuit of claim 1 further comprising a balancing valve communicating with the second side of the piston.

4. The brake circuit of claim 1 wherein the brake circuit is a diagonal split.

5. The brake circuit of claim 4 wherein the brake circuit includes four isolation piston assemblies and four isolation valves.

* * * * *